(No Model.)
J. PEPPER, Jr.
TROLLING HOOK.
No. 496,441. Patented May 2, 1893.
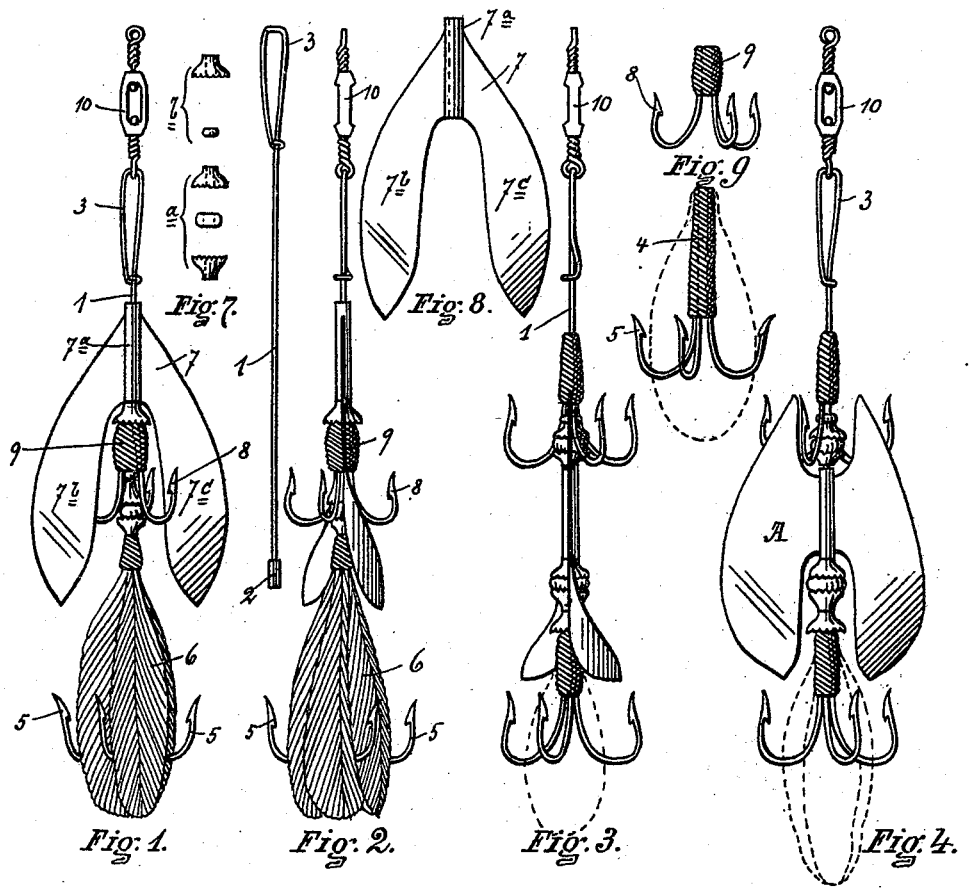
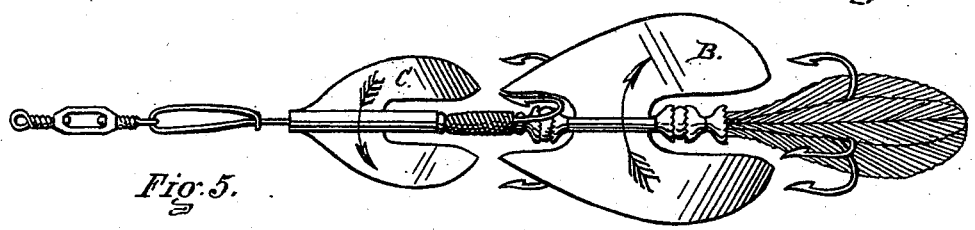
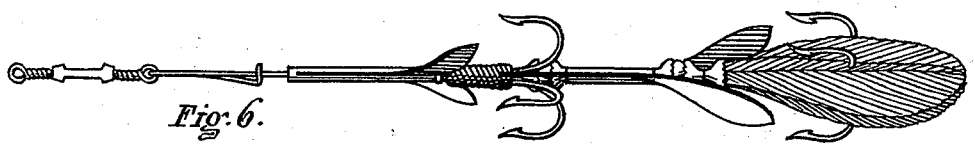
WITNESSES.
Rich. A. George.
M. A. Keller
INVENTOR.
John Pepper Jr.
By Risley & Robinson
Attys

UNITED STATES PATENT OFFICE.

JOHN PEPPER, JR., OF ROME, NEW YORK.

TROLLING-HOOK.

SPECIFICATION forming part of Letters Patent No. 496,441, dated May 2, 1893.

Application filed September 1, 1892. Serial No. 444,722. (No model.)

*To all whom it may concern:*

Be it known that I, JOHN PEPPER, Jr., of Rome, in the county of Oneida and State of New York, have invented certain new and useful Improvements in Trolling-Hooks; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

My invention relates to an improvement in trolling hooks.

In the drawings which accompany and form a part of this specification, and in which similar letters and figures of reference refer to corresponding parts of the several views, Figure 1 shows one form of my improved hook. Fig. 2 shows an edge view of the same hook shown in Fig. 1. Fig. 3 shows an edge view of modified form of hook, the feathers which partially conceal the rear set of hooks being shown only in outline by dotted lines. Fig. 4 shows a side view of the same hook shown in Fig. 3. Fig. 5 shows in side elevation, another form of the hook having two spinners. Fig. 6 shows an edge elevation of the hook shown in Fig. 5. Figs. 7, 8 and 9 show in detail the several parts of the hook shown in Figs. 1 and 2.

Referring more particularly to the reference numerals in a more specific description of the device, 1 indicates a shank formed of metal and having a head 2 at its rear end, and a loop or eye 3 at its forward end, by means of which it may be attached to a suitable swivel or fishing line. On the rear end of the shank, ahead of the head 2, is first provided a rotatable sleeve 4 on which are firmly attached fishing-hooks as 5, and to which may also be attached the feathers 6, which partially conceal the rear set of hooks. Ahead of the sleeve 4, are placed loosely upon the shank ferrules or washers $a$ which serve to separate the rear set of hooks from the forward set, and furnish bearings, which are as nearly as may be frictionless. Above the ferrules or washers $a$ is placed a forward set of hooks 8, which are preferably of smaller size than the rear set, and are mounted upon a sleeve 9 through which the shank 1 passes; the hooks and sleeve being free to rotate upon the shank. Ahead of the sleeve 9 are introduced washers and ferrules $b$ which serve to separate the rear set of hooks from the spinner. Ahead of the washers or ferrules $b$ is provided spinner 7, which has a sleeve or barrel $7^a$ through which the shank passes and is provided with wings $7^b$, $7^c$, which are suitably deflected in opposite directions to cause the spinner to whirl when drawn through water.

It will be observed that the forward set of hooks 8 project between the wings $7^b$ and $7^c$ and the spinner and necessarily rotate therewith. In use, the hook is drawn through the water in the ordinary manner of using trolling-hooks, by a line attached to the eye 3, either directly or by means of intervening swivel 10; as the hook is so drawn, the spinner rotates and at the same time the forward set of hooks 8 are rotated therewith; so that the hooks, or some of them, project at an angle away from the spinner and are in a position with reference to the spinner to more surely hook a fish that may take the hook. The rear set of hooks normally remain stationary, although, if the trolling-hook, as a complete device, should become clogged by grass or weeds engaging with the forward hooks or spinner, and with the rear hooks, all of the hooks would rotate together, and the device would not become clogged and the spinner become useless by a small amount of grass or foreign substance caught on the hook. Further than this, the rear hooks being mounted on a sleeve so as to freely rotate when the hook is taken by a fish, the hooks being arranged by threes, will quickly rotate into position when closed on by a fish, to more surely hook the fish.

In the modified form of construction shown in Figs. 3 and 4, the spinner A is modified in shape and introduced between the sets of hooks; the forward set of hooks, however, rotating with the spinner. In the construction shown in Figs. 5 and 6, a large spinner B is provided and a smaller spinner C on the forward portion of the shank, and these spinners may be free to rotate in opposite directions, as shown, or in the same direction. In case they are made to rotate in the same direction, the hook is not liable to become disabled by the accumulation of a small amount of grass on it, as the hooks and spinners would all rotate together in the same direction upon the shank. This would also be so in the construction shown with the spinners rotating in opposite directions, for the power of the rear spinner would overcome that of the forward one, being much larger; and if the two were stuck together, they would rotate in the direction of the larger spinner.

It is evident that many other modifications and changes than those herein shown, may be made in and from this construction without departing from the equivalents of my invention.

What I claim as new, and desire to secure by Letters Patent, is—

1. The combination in a trolling-hook of a shank, a set of hooks rigidly secured upon a rotatable sleeve mounted upon the shank, and a rotatable spinner independent of the hooks also mounted upon the shank, substantially as set forth.

2. The combination in a trolling-hook of a shank, a set of hooks rigidly secured upon a rotatable sleeve mounted on the shank, and a rotating spinner mounted upon the shank having projecting wings between which the hooks project and with which they rotate, substantially as set forth.

3. The combination in a trolling-hook of a shank, and a hook rigidly secured upon a rotatable sleeve mounted upon the rear end of the shank, a second hook rigidly secured to a separate rotatable sleeve mounted upon the shank in advance of the other, and a rotatable spinner mounted upon the shank in advance of the above sets of hooks and provided with rearwardly extending wings between which the forward hook projects, substantially as set forth.

In witness whereof I have affixed my signature in presence of two witnesses.

JOHN PEPPER, JR.

Witnesses:
CHARLES D. CROOK,
LOUIS F. ECUYER.